C. CORTE.
MULTIPLE WHEEL FOR ROAD VEHICLES.
APPLICATION FILED JULY 8, 1919.

1,351,996.

Patented Sept. 7, 1920.

INVENTOR:
Camillo Corte
By Wm Wallace White
ATTY.

C. CORTE.
MULTIPLE WHEEL FOR ROAD VEHICLES.
APPLICATION FILED JULY 8, 1919.
1,351,996.
Patented Sept. 7, 1920.
2 SHEETS—SHEET 2.
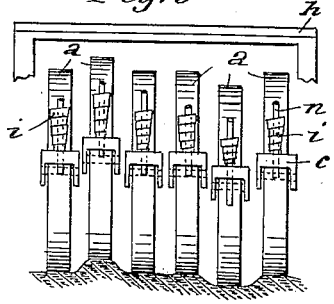
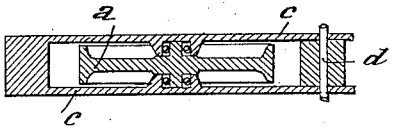
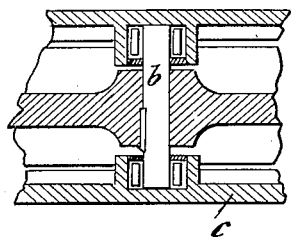
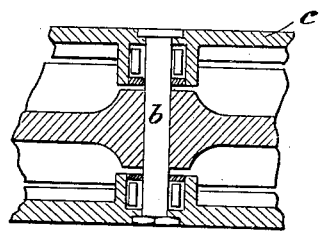
INVENTOR:
Camillo Corte
By Wm Wallace White
ATT'Y.

UNITED STATES PATENT OFFICE.

CAMILLO CORTE, OF ROME, ITALY.

MULTIPLE WHEEL FOR ROAD-VEHICLES.

1,351,996.

Specification of Letters Patent.

Patented Sept. 7, 1920.

Application filed July 8, 1919. Serial No. 309,504.

*To all whom it may concern:*

Be it known that I, CAMILLO CORTE, a subject of the King of Italy, and residing at Rome, Italy, (whose post-office address is Viale Manzoni No. 13,) have invented certain new and useful Improvements in Multiple Wheels for Road-Vehicles, of which the following is a specification.

This invention relates to a vehicle support, the object of the invention being to provide what may be termed a multiple wheel, comprising a plurality of independently mounted wheel members or elements located in parallel relation transversely of the vehicle, the axes of rotation of the elements being adapted to be moved vertically independently of each other.

A further object of the invention is to provide a wheel having a bearing surface corresponding in width approximately to the total width of the vehicle, said bearing surface being capable of adapting itself to the inequalities of the road over which the vehicle travels thereby to provide a vehicle support on which the vehicle body is supported at a constant level regardless of varying conditions of either load or road.

A further object of the invention is to provide a vehicle support of the character set forth, in which each wheel element is independently secured to the vehicle body in such a manner that the load is equally distributed between the several elements constituting the wheels.

With the foregoing and other objects in view, which will appear as the description proceeds, the invention consists in the novel features of construction and combination of parts which will be hereinafter more fully described and particularly pointed out in the claims.

In the drawings accompanying and forming part of this specification,

Fig. 5 is a front elevation of a multiple wheel assembled according to the present invention, the upper frame being removed;

Fig. 6 is a sectional plan view of a single wheel element and its supporting frame; and Figs. 7 and 8 are fragmentary transverse sectional views illustrating different ways of mounting the wheel elements in their frames.

Similar characters of reference designate corresponding parts in the different figures of the drawings.

Figure 1:
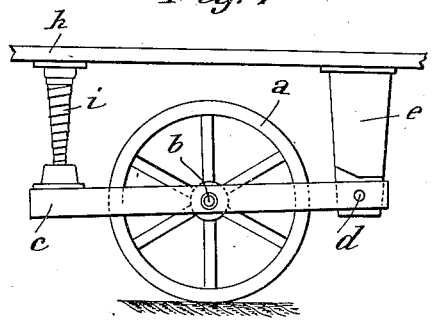
Figure 1 is a fragmentary side elevation illustrating one embodiment of a wheel element mounted according to the present invention.

Referring to the drawings, $a$ designates a wheel element, which if preferred may be in the form of a disk, the combination of a plurality of which constitutes the wheel. A frame $c$ is provided for each of the wheel elements, which are mounted for rotation in their respective frames by means of axles $b$, the frames $c$ being adapted to be secured to a frame $h$ at a suitable distance therebelow to permit a certain range of vertical movement of the wheel elements with relation to the frame $h$, this frame $h$ being in turn adapted to be secured to the vehicle body.

Figure 2:
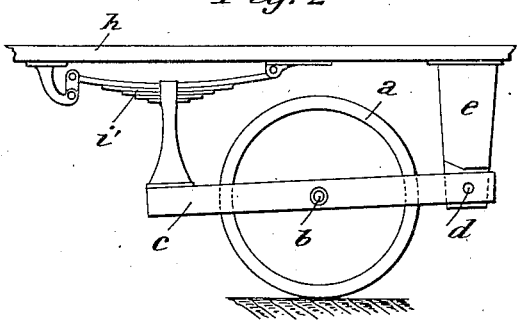
Fig. 2 is a similar view illustrating a modification of the resilient cushioning means.

In the form shown in Figs. 1 and 2, the frame $h$ has a downwardly extending arm $e$, to the lower end of which is pivoted, as indicated at $d$, one end of the frame $c$, the opposite end of the frame $c$ being adapted to be resiliently connected with the frame $h$. In Fig. 1 this resilient connection is shown as being formed by means of a helical spring $i$, while in Fig. 2 a flat spring $i'$ is interposed between the frame $c$ and the frame $h$.

Figure 3:
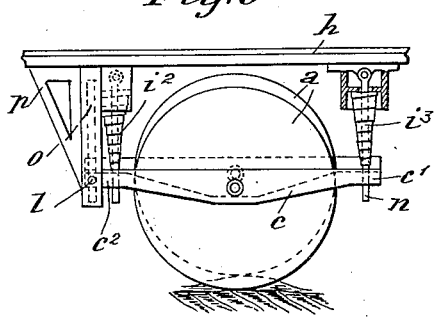
Fig. 3 is a similar view showing a modification of the manner of mounting the wheel elements, the dotted lines indicating the position of one of the wheel elements when passing over an elevated portion of the road.
Figure 4:
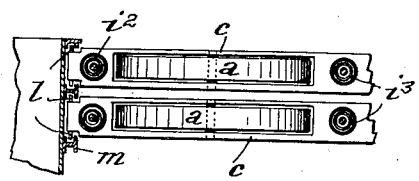
Fig. 4 is a plan view of a pair of adjacent wheel elements mounted in the manner shown in Fig. 3, the top member of the frame being removed.

In the form shown in Fig. 3 the frame $c$, instead of being pivoted to the frame $h$, is resiliently supported at both ends thereof. In this form of the structure a pair of helical cushioning springs $i^2$, $i^3$, are shown supported on depending members $n$ secured to the frame $h$, the front and rear ends $C^1$, $C^2$, of the frame $c$ being provided with an opening through which passes the pin $n$ at each end of the frame $c$, whereby the cushioning springs $i^2$, $i^3$ are retained in position between the frame $c$ and frame $h$. For the purpose of guiding the frame $c$ in its vertical movements a rigid bracket $p$ is secured to the frame $h$ and is provided vertically thereof with I-shaped portion m forming a groove at each side of a frame c, the frame being provided with a transverse pin l adapted to coöperate with the grooves o for guiding the frame in its vertical movements.

By reason of the construction described, it will be observed that the springs are arranged in the same vertical plane as the respective wheel elements to which they belong, which arrangement permits the wheel elements to be placed very closely together transversely of the vehicle, and thereby allows a large number of wheel elements to be mounted in a comparatively narrow space. It will also be observed that the multiple wheel takes the form of a roller formed of a plurality of elements arranged side by side and thus provides a very wide bearing or tread surface which is capable of adapting itself to the inequalities of the road.

It will be understood, of course, that the shafts or axles b may be made integral with either the wheel elements a or with the frame c, and in either case ball or roller bearings as shown in Figs. 7 and 8, may be interposed between the axles and the journal boxes.

While I have described in detail the embodiments of the invention herein illustrated, it is to be understood that I do not thereby limit my invention to the precise details of construction herein set forth, as I am aware that many mechanical changes and modifications may be made without departing from the spirit and scope of the invention, as set forth in the appended claims.

Having thus described my invention, what I claim is:

1. A vehicle wheel, comprising a plurality of rotatable elements arranged in alinement transversely of the vehicle and adapted to be spaced below the vehicle body, and resilient means for permitting independent vertical movement of said elements relative to the vehicle body.

2. A vehicle wheel constructed as set forth in claim 1, each of said resilient means being located in the same vertical plane as its respective wheel element.

In testimony whereof I have hereunto signed my name in the presence of two witnesses.

CAMILLO CORTE.

Witnesses:
 ELENA TOSI,
 OEPA DEL LOEOLO.